United States Patent [19]

Greenhalgh et al.

[11] 4,122,087
[45] Oct. 24, 1978

[54] BENZODIPYRROLE DYESTUFFS

[75] Inventors: Colin William Greenhalgh; John Laurence Carey; David Francis Newton, all of Manchester, England

[73] Assignee: Imperial Chemical Industries Limited, London, England

[21] Appl. No.: 887,201

[22] Filed: Mar. 15, 1978

Related U.S. Application Data

[62] Division of Ser. No. 773,229, Mar. 1, 1977.

[30] Foreign Application Priority Data

Mar. 10, 1976 [GB] United Kingdom ............ 9513/76

[51] Int. Cl.$^2$ ............................................ C07D 487/04
[52] U.S. Cl. .............................................. 260/325 R
[58] Field of Search ................................... 260/325 R

[56] References Cited
PUBLICATIONS

Ruggli et al., Chemical Abstracts, vol. 29, cols. 4761–4762 (1935).

Primary Examiner—Alton D. Rollins
Attorney, Agent, or Firm—Cushman, Darby & Cushman

[57] ABSTRACT

Substituted 2,6-dioxo-2,6-dihydrobenzo[1:2-b, 4:5-b']difurans or -dipyrroles and processes for their manufacture. The compounds are dyestuffs which are particularly useful in the form of aqueous dispersions for application to polyester textile materials.

2 Claims, No Drawings

BENZODIPYRROLE DYESTUFFS

This is a division of application Ser. No. 773,229, filed Mar. 1, 1977.

This invention relates to dyestuffs containing a new heterocyclic chromophoric system, which dyestuffs are valuable for colouring textile materials.

According to the invention there are provided dyestuffs which contain a chromophoric system of the formula:

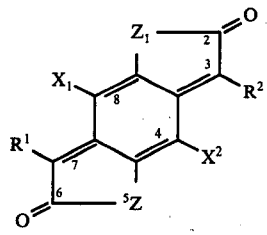

wherein each Z is oxygen or —NY in which Y is an optionally substituted hydrocarbon radical or an acyl radical; $R^1$ and $R^2$ each independently represent a naphthyl radical, an unsubstituted phenyl radical or a phenyl radical substituted by at least one of the following:- nitro, halogen, lower alkyl, lower alkoxy, phenyl, lower alkoxyphenyl, phenoxy, cyano, carboxylic acid, carboxylic acid ester, optionally substituted carbamoyl, sulphonic acid, sulphonyl chloride, sulphonic acid ester, optionally substituted sulphamoyl, mercapto, lower alkylthio, phenyl thio, primary, secondary, tertiary or quaternary amino, acyl amino, phosphonic acid, phosphonic acid ester, lower alkylsulphonyl, phenylsulphonyl, aldehyde, azo, and acyloxy groups of the formula O.CO.T. in which T is an alkyl group containing at least two carbon atoms, a substituted phenyl group, a lower alkoxy group or a phenoxy group; and $X^1$ and $X^2$ each independently represent a hydrogen atom, chlorine, bromine, cyano, lower alkyl, lower alkoxy, optionally substituted carbamoyl, carboxylic acid or carboxylic acid ester group. The optionally substituted carbamoyl groups represented by $X^1$ and $X^2$ are preferably of the formula:

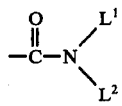

wherein $L^1$ and $L^2$ are each independently hydrogen, lower alkyl or phenyl. The carboxylic acid ester groups represented by $X^1$ and $X^2$ are preferably of the formula: —COOL$^3$ wherein $L^3$ is an optionally substituted alkyl, in particular lower alkyl or monocyclic aryl, in particular phenyl, radical.

Throughout this Specification the terms "lower alkyl" and "lower alkoxy" are used to denote alkyl and alkoxy groups respectively containing from 1 to 4 carbon atoms. Dyestuffs of the invention containing the said chromophoric system can be obtained by a number of methods:

(a) Reaction of compounds of the formula:

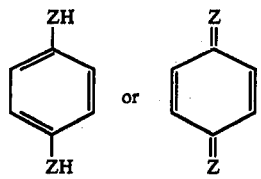

Formula I     Formula II which are optionally substituted by one or more halogen atoms with an arylacetic acid or derived ester or an α-halogeno- or α-hydroxyarylacetic acid or derived ester, provided that when starting from I at least one of the two reactants is substituted by halogen or hydroxy. The aryl radical of the aryl acetic acid or derivative thereof may carry substituents, for example, nitro, lower alkyl, lower alkoxy, acylamino or halogen.

When starting from a compound of Formula II, then the compounds containing the said chromophoric system are obtained directly. However when starting from a compound of Formula I, an oxidation treatment may be additionally required. In some cases this takes place automatically in the presence of air, whilst in other cases it is preferred to treat the initial reaction product with an oxidising agent, such as an aqueous solution of hydrogen peroxide or potassium persulphate.

This reaction can be conveniently carried out by heating the two reactants together at elevated temperatures, optionally in the presence of an inert organic liquid (such as a di- or tri-chlorobenzene, or in the presence of an acid (such as acetic acid or sulphuric acid) or in the presence of an acidic agent such as zinc chloride. If desired an inert organic liquid can be used in conjunction with an acid or an acidic agent. The resulting product is then isolated in conventional manner; for example by filtering it off when it is insoluble in the reaction medium, or by adding a liquid to precipitate it from solution in the reaction medium and then filtering off the solid.

When it is preferred to include a deliberate oxidation treatment then this can be conveniently carried out by, for example, isolating the initial reaction product and subjecting this to oxidation, for example in a mixture of acetic acid and an aqueous solution of hydrogen peroxide or nitric acid. Alternatively the oxidation can be carried out without isolation of the initial reaction product by adding an oxidising agent, for example nitric acid, to the reaction medium.

As specific examples of compounds of Formula I or Formula II there may be mentioned 1:4-benzoquinone, hydroquinone, 2:5-dichloro-1:4-benzoquinone, 2:3:5:6-tetrachloro-1:4-benzoquinone (chloranil) and 2:3:5:6-tetrabromo-1:4-benzoquinone (bromanil).

As examples of the said acids or esters which are used in this process there may be mentioned α-hydroxyphenylacetic acid (mandelic acid), phenylacetic acid, methyl phenylacetate, α-chlorophenyl acetic acid, 4-nitrophenylacetic acid, 4-acetylaminophenylacetic acid, 4-methoxyphenylacetic acid, pyridyl-2-acetic acid and benzimidazole-2-acetic acid.

(b) When Z is oxygen, cyclisation of quinones of the formula:

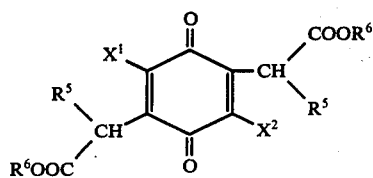

Formula III wherein $X^1$ and $X^2$ have the meanings stated, $R^5$ is a carboxylic acid ester or amide group and $R^6$ is hydrogen, alkyl or aryl.

(c) When Z is oxygen, dehydrohalogenation of compounds of the formula:

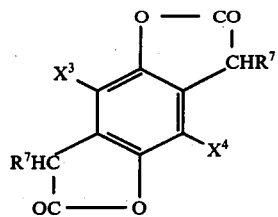

Formula IV wherein $R^7$ is a halogen atom, and $X^3$ and $X^4$ are independently halogen, alkyl or aryl.

(d) When Z is oxygen, reaction of quinones of the formula:

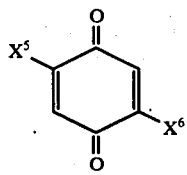

Formula V wherein one of $X^5$ and $X^6$ is hydrogen, halogen, lower alkyl or cyano, and the other is halogen, lower alkyl or cyano, with cyanoacetic acid.

This reaction can be conveniently carried out by stirring the reactants together, optionally at elevated temperatures, in the presence of a liquid medium, such as aqueous acetone, and preferably in the presence of a condensation agent such as zinc chloride. The resulting product is then isolated in conventional manner.

As specific examples of the compounds of Formula V there may be mentioned 1:4-benzoquinone, 2-chloro-1:4-benzoquinone, and 2:5-dichloro-1:4-benzoquinone.

This reaction results in the production of dyestuffs of the formula:

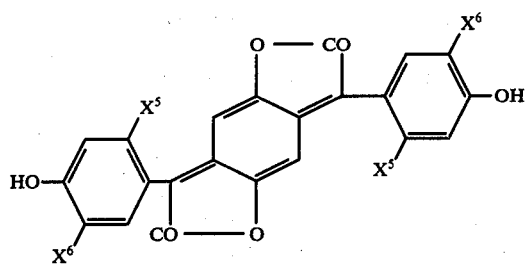

(e) When Z is nitrogen, the steps of
(i) reacting a p-phenylenediamine of the formula

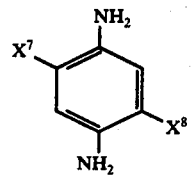

Formula VI wherein $X^7$ and $X^8$ are independently hydrogen, halogen, lower alkyl or cyano, with an α-hydroxyarylacetic acid or its derived ester, or an α-acyloxyarylacetic acid, its derived ester or acid halide, to give an intermediate of the formula:

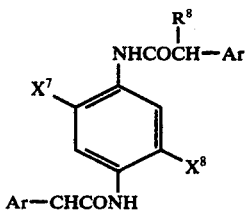

Formula VII wherein Ar is the aromatic radical from the arylacetic acid or derivative thereof and $R^8$ is a hydroxy or acyloxy group.

The radical Ar may carry substituents, for example, nitro, acylamino, lower alkyl, lower alkoxy, halogen or acyloxy.

The reaction is carried out in an inert organic liquid (such as a di- or tri-chlorobenzene) and, in the case in which an acid halide is used, in the presence of an acid-binding agent.

(ii) cyclisation of the intermediate of Formula VII, for example, with concentrated sulphuric acid, to give an intermediate of the formula:

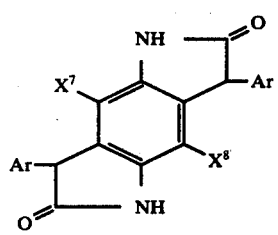

Formula VIII and (iii) reaction of the intermediate of Formula VIII with an acylating agent to give a dyestuff of formula:

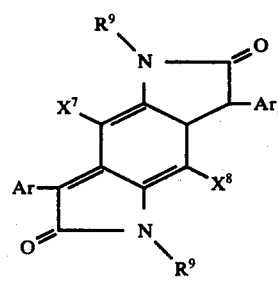

wherein $R^9$ is an acyl group. The acylating agent may be an acid chloride or anhydride, for example, acetyl chloride, acetic anhydride or benzoyl chloride. This final stage involves an oxidation for which the presence of atmospheric oxygen is usually sufficient, although other oxidising agents such as hydrogen peroxide or potassium persulphate may be used if desired.

(f) When Z is nitrogen, the steps of (i) reacting an N,N'-dialkyl-p-phenylenediamine of the formula:

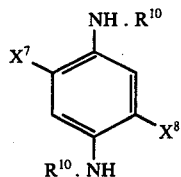

Formula IX wherein $X^7$ and $X^8$ have the meanings defined above and $R^{10}$ is a lower alkyl group, with an α-acyloxyarylacetic acid halide, in an inert organic liquid and in the presence of an acid binding agent, to give an intermediate of the formula:

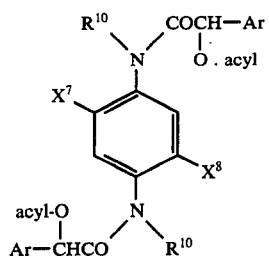

Formula X wherein Ar is the aromatic radical, i.e. an optionally substituted phenyl or naphthyl radical, from the α-acyloxyaryl acetic.

(ii) cyclisation of the intermediate of Formula X, for example, with sulphuric or polyphosphoric acid, to give an intermediate of the formula:

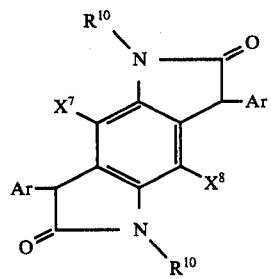

Formula XI and (iii) oxidation of the intermediate of Formula XI, for example, with hydrogen peroxide or potassium persulphate, to give a dyestuff of the formula:

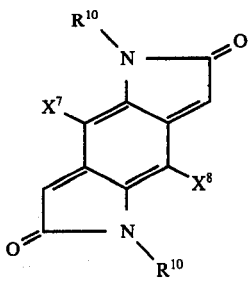

The dyestuffs of the invention contain the said chromophoric system and optionally other substituents which are conventionally present in dyestuffs. The methods outlined above for the production for the said dyestuffs are directed to the synthesis of the said chromophoric system. Having prepared dyestuffs by the said methods of synthesis other substituents can be introduced by conventional methods, or substituents already present can be converted to other substituents in known manner. The following are illustrative of such reactions:

(a) sulphonic acid groups can be introduced by sulphonation methods, and sulphonyl chloride groups by reaction with chlorosulphonic acid (b) nitro groups can be introduced by nitration methods (c) hydroxy groups can be converted to acyloxy groups by treatment with acylating agents (d) nitro groups can be reduced to amino groups.

(e) amino groups can be converted to acylamino groups by treatment with acylating agents.

(f) tertiary amino groups can be converted to quaternary amino groups.

If desired the said chromophoric system can also be incorporated into other dyestuff systems. Thus, for example, dyestuffs containing both the said chromophoric system and an azo system can be prepared by coupling a diazotised amine onto a dyestuff of the present invention which contains a phenolic hydroxy group. Alternatively a dyestuff of the present invention which contains a diazotisable amino group can be diazotised and coupled onto a coupling component. Also a dyestuff of the present invention which additionally contains an azo group can be obtained by synthesis of the chromophoric system directly from an intermediate which already contains an azo group. As a further example dyestuffs containing both the said chromophoric system and a nitro dyestuff system can be obtained by for example, condensing a dyestuff of the present invention containing an aminophenyl residue with a halogenonitrobenzene.

The dyestuffs of the invention are valuable for colouring natural and synthetic textile materials. Thus the dyestuffs of the invention which are free from water-solubilising groups (i.e. sulphonic acid, carboxylic acid or quaternary ammonium groups) are valuable for colouring synthetic textile materials for example cellulose acetate and cellulose triacetate textile materials, polyamide textile materials such as polyhexamethyleneadipamide textile materials polyacrylonitrile textile materials, and preferably aromatic polyester textile materials such as polyethylene terephthalate textile materials. Such textile materials can be in the form of threads, yarn, or woven or knitted fabric. If desired the said synthetic textile materials can be in the form of blends with other textile materials, for example blends of polyester textile materials with cellulose or woollen textile materials.

Such textile materials can conveniently be coloured with the water-insoluble dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.;

in the case of cellulose triacetate or polyamide textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively, the aqueous dispersion of the said dyestuff can be applied to the textile material by a padding or printing process, followed by heating at temperatures up to 230° C. depending on the textile material, or by steaming of the textile material. In such processes it is preferred to incorporate a thickening agent, such as gum tragacanth, gum arabic or sodium alginate, into the aqueous dispersion of the said azo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an aqueous solution of an alkali, such as sodium carbonate or sodium hydroxide, before the soaping treatment in order to remove loosely attached dyestuff from the surface of the textile material.

The water-insoluble dyestuffs have excellent affinity and building up properties on aromatic polyester textile materials, so enabling deep shades to be obtained. The resulting coloration have good to excellent fastness to light, to wet treatments, to perspiration, and in particular to dry heat treatments such as those carried out at high temperatures during pleating operations.

If desired the water-insoluble dyestuffs of the invention can be applied to synthetic textile materials in conjunction with other disperse dyes, such as are described in, for example, British patent specifications Nos. 806,271, 835,819, 840,903, 847,175, 852,396, 852,493, 859,899, 865,328, 872,204, 894,012, 908,656, 909,843, 910,306, 913,856, 919,424, 944,513, 944,722, 953,887, 959,816, 960,235, 961,412, 976,218, 993,162 and 998,858.

Those dyestuffs of the invention which are soluble in water by virtue of the presence of quaternary ammonium groups can be used as Basic Dyestuffs for the dyeing of polyacrylonitrile textile materials or of polyamide and polyester textile materials which contain acidic groups which confer affinity on such textile materials for Basic Dyestuffs. The said dyestuffs can be applied in conventional manner to these textile materials from acid, neutral or slightly alkaline dyebaths, the pH of which is preferably maintained in the range of 3 to 8, at temperatures between 40° C. and 120° C., preferably between 80° C. and 120° C., or by printing techniques using thickened print pastes containing the said dyestuffs.

Those dyestuffs of the invention which are soluble in water by virtue of the presence of acidic water-solubilising groups can be used for colouring natural or synthetic polyamide textile materials such as wool, silk or polyhexamethylene adipamide textile materials. Such dyestuffs can be applied in conventional manner to the said textile materials from aqueous dyebaths, the pH of which is preferably maintained in the range of 4 to 9.

Those dyestuffs of the invention which contain acidic water-solubilising groups can be used for colouring cellulose textile materials, the dyestuffs being applied by conventional methods to such textile materials.

Dyestuffs of the invention can also be applied to textile materials by transfer printing processes, including such processes carried out at reduced pressures or under moist or humid conditions. Dyestuffs of the invention can also be used in mass colouration processes.

Insoluble dyestuffs of the present invention can also be used as pigments for the colouration of inks and paints, such dyestuffs being incorporated in known manner into conventional ink or paint formulations.

The invention is illustrated but not limited by the following Examples in which the parts and percentages are by weight.

EXAMPLE 1

A mixture of 2.2 parts of hydroquinone, 6.68 parts of mandelic acid ($\alpha$-hydroxyphenylacetic acid) and 20 parts of 73% sulphuric acid is stirred at 120° C. for 5 minutes. The mixture is cooled, poured into water and the colourless precipitated solid filtered off, washed with water, then with diethylether, and is dried.

A mixture of 1 part of this solid, 20 parts of acetic acid and 5 parts of 100 vol hydrogen peroxide solution is stirred for minutes at the boil under a reflux condenser. The mixture is diluted with water, and the precipitated orange solid is filtered off, washed with water and dried. Crystallisation from toluene gives 3:7-diphenyl-2:6-dioxo-2:6-dihydrobenzo [1:2-b; 4:5-$b^1$] difuran in the form of orange coloured crystals which melt at 295°–296° C. The mass spectra, infra red and n.m.w. spectra of the compound are consistent with this structure. The dyestuff dissolves in chloroform to give a yellow solution with $\lambda$ max 466 n.m. and it has a molecular extinction coefficient of 50,000.

When dispersed in aqueous medium this dyestuff dyes aromatic polyester textile materials in bright orange shades having excellent fastness to light. Any unfixed dyestuff on the surface of the textile material is readily removed by treatment in a dilute aqueous solution of sodium hydroxide at 80° C.

EXAMPLE 2

A mixture of 2.2 parts of hydroquinone, 6.6 parts of mandelic acid, 20 parts of acetic acid and 1 part of sulphuric acid is stirred for 4 hours at the boil under a reflux condenser. The mixture is cooled to 30° C., 2 parts of 100 vol hydrogen peroxide solution are added, and the mixture stirred at the boil for 1½ hours. The mixture is poured into 300 parts of icc and water, and the precipitated solid is filtered off. After extraction with boiling ethanol the residue is crystallised from toluene to give the same dyestuff as is obtained in Example 1.

EXAMPLE 3

A mixture of 5.5 parts of hydroquinone and 15.2 parts of mandelic acid is stirred for 4 hours at 195°–200° C. The mixture is cooled to 100° C., 100 parts of acetic acid and 10 parts of a 100 vol hydrogen peroxide solution added, and the mixture stirred for 1 hour at the boil. The mixture is then cooled, and the precipitated solid is filtered off washed with acetic acid and then with methanol and is finally dried. The same dyestuff as that of Example 1 is obtained.

EXAMPLE 4

A mixture of 4.2 parts of 1:4-benzoquinone, 18 parts of mandelic acid and 30 parts of trichlorobenzene is stirred for 7 hours at 180° C. The mixture is cooled to 20° C. and the precipitated dyestuff is filtered off, washed with toluene then with a light petroleum fraction, and is finally dried.

The resulting dyestuff is identical with the dyestuff of Example 1.

EXAMPLE 5

A mixture of 4.9 parts of chloranil (2:3:5:6-tetrachlorobenzoquinone), 12 parts of mandelic acid and 25 parts of trichlorobenzene is stirred for 20 hours at 180° C. The mixture is cooled to 20° C. and the precipitated solid is filtered off, washed with trichlorobenzene and then crystallised from toluene. The solid is then dissolved in chloroform, the chloroform solution extracted with a 2% aqueous solution of sodium carbonate, and the chloroform then removed by distillation. 4:8-Dichloro-3:7-diphenyl-2:6-dioxo-2:6-dihydrobenzo[1:2-b:4:5-b$^1$] bifuran is obtained. The product has a melting point of 310° C.–315° C., a λ max in chloroform of 457 n.m. and a molecular extinction coefficient of 45000. The n.m.r. and mass spectra are consistent with the stated structures.

When dispersed in aqueous medium the dyestuff dyes aromatic polyester textile materials in bright yellow shades.

EXAMPLE 6

A mixture of 5 parts of 2:3:5:6-tetrachlorohydroquinone, 6.7 parts of mandelic acid and 50 parts of o-dichlorobenzene is stirred for 24 hours at the boil under a reflux condenser. The mixture is cooled and the precipitated solid filtered off, and purified as described in Example 5. The same dyestuff is obtained.

EXAMPLE 7

A mixture of 1 part of the dyestuff of Example 1 and 20 parts of sulphuric acid monohydrate is stored for 1½ hours at 0°–5° C. The mixture is poured into a solution of sodium chloride at 0° C., and the precipitated solid is filtered off, washed with an aqueous solution of sodium chloride and dried.

Analysis shows that the product consists essentially of the disodium salt of 3:7-di(sulphophenyl)-2:6-dioxo-2:6-dihydrobenzo [1:2-b:4:5-b$^1$] difuran.

The resulting product dyes wool and synthetic polyamide textile materials from an aqueous dyebath in bright orange shades.

EXAMPLE 8

A mixture of 3.6 parts of 2:5-dichlorohydroquinone, and 6.0 parts of mandelic acid is stirred for 2 hours at 210°–220° C. The mixture is cooled to 120° C., 25 parts of toluene added, the mixture further cooled to 30° C. and acetone added until a solution of the product is obtained. The solution is filtered, the filtrate evaporated to dryness in vacuo, and the resulting solid is crystallised from methanol.

Analysis shows that the product consists of a mixture of 3:7-diphenyl-2:6-dioxo-2:6-dihydrobenzo [1:2-b:4:5-b$^1$] difuran, 4:8-dichloro-3:7-diphenyl-2:6-dioxo-2:6-dihydrobenzo [1:2-b:4:5-b$^1$] difuran and 4- or 8-chloro-3:7-diphenyl-2:6-dioxo-2:6-2:6-dihydrobenzo [1:2-b:4:5-b$^1$] difuran. This dissolves in chloroform to give an orange solution having a λ max of 460 n.m.

EXAMPLE 9

A mixture of 2.45 parts of chloranil, 4 parts of phenylacetic acid, 0.5 part of zinc chloride and 25 parts of trichlorobenzene is stirred for 1¾ hours at 190°–200° C. The mixture is cooled to 20° C., the solid is filtered off, washed with a light petroleum ether and dried. The product is the same as that produced by the process of Example 5 and, if necessary, can be purified in a similar manner.

EXAMPLE 10

1 Part of the dyestuff of Example 1 is gradually added to 35 parts of chlorosulphonic acid at 0°–5° C., and the mixture is then stirred for 30 minutes at 20° C. The mixture is poured onto 200 parts of ice, and the precipitated 3:7-di(p-chlorosulphonylphenyl)-2:6-dioxo-2:6-dihydrobenzo[1:2-b; 4:5-b$^1$] difuran is filtered off, washed with ice-cold water and dried.

EXAMPLE 11

1.1 Parts of the product of Example 10 are added to 15 parts of aniline at 0°–5° C., and the mixture stirred for 30 minutes. The mixture is poured into a dilute aqueous solution of hydrochloric acid and the the precipitated solid is filtered off, washed with water and dried. Crystallisation from pyridine affords 3:7-di(p-N-anilinosulphonylphenyl) 2:6-dioxo-2:6-dihydrobenzo [1:2-b; 4:5-b$^1$] difuran.

EXAMPLE 12

A mixture of 1.1 parts of benzoquinone, 4.4 parts of α-chlorophenylacetic acid and 25 parts of trichlorobenzene is stirred at the boil for 7 hours. The mixture is cooled and the precipitated solid is filtered off. Crystallisation from toluene affords the dyestuff of Example 1.

EXAMPLE 13

A mixture of 4.9 parts of chloranil, 10.86 parts of 4-nitrophenylacetic acid, 2 parts of zinc chloride and 50 parts of trichlorobenzene is stirred at the boil for 2 hours in a nitrogen atmosphere. The mixture is cooled and the precipitated solid is filtered off, washed successively with chlorobenzene, methanol, water and acetone, and finally dried.

Analysis shows the product to be 4:8-dichloro-3:7-di(p-nitro phenyl)-2:6-dioxo-2:6-dihydrobenzo[1:2-b; 4:5-b$^1$] difuran.

This product can be used as a pigment in paints, by milling the product in a solvent based paint medium containing titanium dioxide. When the resulting product is coated onto a surface and then dried a yellow paint film is obtained which has excellent fastness to light.

EXAMPLE 14

A mixture of 4.25 parts of bromanil, 8.0 parts of phenylacetic acid and 25 parts of trichlorobenzene is stirred for 1 hour at the boil. The mixture is cooled, the precipitated solid is filtered off, washed with chlorobenzene and then with ethanol, and is finally dried. Analysis shows the product to be 4:8-dibromo-3:7-diphenyl-2:6-dioxo-2:6-dihydrobenzo [1:2-b; 4:5-b$^1$] difuran.

1 Part of this product is milled into a solution of 5 parts of a low viscosity ethyl hydroxyethyl cellulose in a mixture of 5 parts of isopropanol and 89 parts of an aliphatic petroleum fraction boiling at 100° C. to 120° C. The resulting ink is printed onto paper and the paper then dried. The printed paper is placed in contact with a woven polyester textile material and transfer printing effected by heating the two materials whilst in contact in a vacuum transfer printing press for 30 seconds at 220° C. in an applied vacuum of 680 mm of mercury.

A strong bright yellow print is obtained which has good fastness to light and to wet treatments.

The product of this Example can also be used to mass colour an aromatic polyester by tumbling 1 part of the product with 100 parts of polyethylene terephthalate in the form of chips, and then melting the resulting mixture and spinning it into filaments in conventional equipment. The resulting bright yellow filaments have good fastness to light and to wet and dry heat treatments.

An aqueous dispersion of the product can also be applied to a polyester/cotton union by a conventional printing technique, the dyestuff subsequently being fixed by steaming for 6 minutes in superheated steam at 180° C. Any unfixed dyestuff on the surface of the textile material is then removed by a rinse in an 0.6% aqueous solution of sodium hydroxide at 80° C. A bright yellow print is obtained and there is excellent reserve of the white unprinted portions.

EXAMPLE 15

A mixture of 4.24 parts of bromanil, 4.98 parts of p-methoxyphenyl acetic acid and 25 parts of trichlorobenzene is stirred for 45 minutes at the boil. The mixture is cooled, 25 parts of ethanol added, and the precipitated solid is filtered off, washed with ethanol and dried. 4:8-dibromo-3:7-di(p-methoxyphenyl)-2:6-dioxo-2:6-dihydrobenzo[1:2-b; 4:5-b$^1$] difuran is obtained in the form of red needles with a green reflex. The product dissolves in chloroform to give a bright red solution with λ max 532 n.m.

When dispersed in aqueous medium the product dyes aromatic polyester textile materials in bright red shades.

EXAMPLES 16 TO 24

In place of the 4.98 parts of p-methoxyphenylacetic acid used in Example 15 there are used equivalent amounts of the arylacetic acids given in the table below. Reaction times from 45 minutes to 6 hours are used to ensure that reaction is complete.

| Example | Arylacetic acid | Color of Product |
|---|---|---|
| 16 | 3,4-dimethoxyphenyl | red |
| 17 | 4-tolyl | yellow |
| 18 | 4-(4'-methoxyphenyl)phenyl | bluish-red |
| 19 | 4-iodophenyl | yellow |
| 20 | 4-chlorophenyl | yellow |
| 21 | 3,4,5-trichlorophenyl | yellow |
| 22 | α-naphthyl | scarlet |
| 23 | 3-nitrophenyl | yellow |
| 24 | 3-ethoxycarbonylphenyl | yellow |

EXAMPLE 25

A mixture of 4.24 parts of bromanil, 9.4 parts of ethyl 4-N,N-diethylaminophenylacetate and 10 parts of trichlorobenzene is stirred and heated at 185°–190° C. for 2 hours. After cooling the mixture, the solvent is removed by steam distillation and the residue is crystallised from toluene to give a product which is essentially 4,8-dibromo-3,7-di-(p-N,N-diethylaminophenyl)-2,6-dioxo-2,6-dihydrobenzo[1:2-b; 4:5-b$^1$] difuran. When dissolved in pyridine a bright greenish turquoise solution is obtained having λ max 726 nm and a molecular extinction coefficient of 69,000.

When applied to an aromatic polyester textile material from an aqueous dispersion the dyestuff gives a bright greenish turquoise shade, having moderate build-up properties.

EXAMPLE 26

When the 9.4 parts of ethyl 4-N,N-diethylaminophenylacetate used in Example 25 are replaced by 9 parts of ethyl mandelate, a product identical with that produced in Example 14 is obtained.

EXAMPLE 27

2.5 parts of the product of Example 13 are milled in 1000 parts of ethyl acetate until a fine dispersion is obtained, the dispersion then being hydrogenated at 20° C. using 1.5 parts of a palladium-on-charcoal catalyst. The almost colourless solution so obtained is filtered from the catalyst and the filtrate (which tends to turn blue in air) is evaporated to give a pale blue product consisting essentially of 4,8-dichloro-3,7-di-(p-aminophenyl)-2,6-dioxo-2,3,6,7-tetrahydrobenzo[1:2-b; 4:5-b$^1$] difuran. This material is stirred at 100° C. with 50 parts of acetic acid and 5 parts of hydrogen peroxide (100 volume: 30% w/w) for 1 hour. The precipitated 4,8-dichloro-3,7-di(p-aminophenyl)-2,6-dioxo-2,6-dihydrobenzo[1:2-b; 4:5-b$^1$] difuran is filtered off, washed with methanol and dried. The product is sparingly soluble in many organic solvents; in dimethylformamide it gives a blue solution having λ max. 690 nm. The mass spectrum and infra-red spectrum are fully consistent with the above structure.

When applied to an aromatic polyester textile material from an aqueous dispersion the dyestuff gives a blue shade with moderate build-up and having a light fastness of 4–5.

EXAMPLE 28

1 Part of the dyestuff of Example 27, 20 parts of acetic acid, 20 parts of acetic anhydride and 0.5 part of sulphuric acid are stirred and heated at 100° C. for 1 hour. After cooling the mixture to 20° C. the orange-coloured 4,8-dichloro-3,7-di(p-acetylaminophenyl)-2,6-dioxo-2,6-dihydrobenzo[1:2-b; 4:5-b$^1$] difuran is filtered off, washed successively with acetic acid, water and methanol, and dried. The mass spectrum and infra-red spectrum of the product are fully consistent with the above structure.

EXAMPLE 29

A mixture of 27 parts of p-phenylenediamine, 86 parts of mandelic acid (or the equivalent amount of ethyl mandelate) and 400 parts of monochlorobenzene is stirred and heated under reflux for 5 hours whilst allowing the water (or ethanol) formed in the reaction to distil off. After cooling the mixture, the precipitated 1,4-di(α-hydroxyphenylacetylamino)benzene is filtered off, washed successively with chlorobenzene and methanol, and dried. The yield is 88 parts.

5 Parts of the intermediate obtained above are added to 50 parts of 98% w/w sulphuric acid with stirring, and the solution obtained is stirred at 20° C. for 18 hours. The reaction mixture is poured into 500 parts of an ice/water mixture and the precipitated product is filtered off, washed with water and dried to give 4.5 parts of 3,7-diphenyl-2,6-dioxo-1,2,3,5,6,7-hexahydrobenzo[1:2-b; 4:5-b$^1$]dipyrrole.

The mass spectrum of this product has m/e of 340, consistent with the above structure, together with an m/e of 338 corresponding to 3,7-diphenyl-2,6-dioxo-1,2,5,6-tetrahydrobenzo[1:2-b; 4:5-b$^1$] dipyrrole, although it is considered that this latter compound is predominantly formed in the mass spectrometer.

A mixture of 4 parts of the above dipyrrole intermediate, 50 parts of acetic anhydride and 1 part of 98% w/w sulphuric acid is stirred and heated under reflux for 2 hours, during which time a yellow-brown product comes out of solution. After cooling the mixture, the product is filtered off, washed successively with acetic acid and diethyl ether, and dried to give 2.8 parts of N,N'-diacetyl-3,7-diphenyl-2,6-dioxo-1,2,5,6-tetrahydrobenzo[1:2-b; 4:5-b¹] dipyrrole as orange-brown crystals, m.p. 303° C. The product dissolves in toluene to give an orange-coloured solution having λ max 470, and it has a molecular extinction coefficient ε max 42,800. The mass spectrum, n.m.r. and infra-red spectra are fully consistent with the above structure.

When applied to an aromatic polyester textile material from an aqueous dispersion medium the dyestuff gives a bright orange shade of high light fastness.

EXAMPLE 30

A mixture of 5 parts of 3,7-diphenyl-2,6-dioxo-1,2,3,5,6,7-hexahydrobenzo[1:2-b; 4:5-b¹9 dipyrrole, prepared as described in Example 29, 50 parts of n-butyric anhydride and 1 part of 98% w/w sulphuric acid is stirred and heated under reflux for 4 hours. After cooling the mixture, the precipitated product is filtered off, washed with ethanol and dried to give N,N'-di-n-butyryl-3,7-diphenyl-2,6-dioxo-1,2,5,6-tetrahydrobenzo[1:2-b; 4:5-b¹]dipyrrole as orange crystals, m.p. 244°-245° C.

When applied to an aromatic polyester textile material from an aqueous dispersion medium the dyestuff gives a bright orange shade of high light fastness.

EXAMPLE 31

A mixture of 5 parts of 3,7-diphenyl-2,6-dioxo-1,2,3,5,6,7-hexahydrobenzo[1:2-b; 4:5-b¹] dipyrrole, prepared as described in Example 29, 50 parts of pyridine and 8 parts of isobutyryl chloride is heated under reflux for 2 hours. After cooling, the reaction-mixture is poured into ice-cold dilute hydrochloric acid and the precipitated product is filtered off, washed with ethanol and recrystallised from acetic acid to give orange crystals of N,N'-di-isobutyryl-3,7-diphenyl-2,6-dioxo-1,2,5,6-tetrahydrobenzo [1:2-b; 4:5-b¹] dipyrrole having mp 270°-271° C. This product dissolves in toluene to give an orange-coloured solution having λ max 474 and it has a molecular extinction coefficient ε max. 36,000. The mass spectrum and n.m.r. spectrum are in full agreement with the above structure.

When applied to an aromatic polyester textile material from an aqueous dispersion medium the dyestuff gives a bright orange shade of high light fastness.

The dyestuff of this Example can also be used to mass colour an aromatic polyester by the method described in Example 14. The resulting bright orange filaments have good fastness to light.

EXAMPLES 32 TO 36

In place of the 8 parts of isobutyryl chloride used in Example 31 there are used equivalent amounts of the acid chlorides given in the table below, to provide similar dyestuffs having the colours given in the final column of the table:

| Example | Acid Chloride | Color of Product |
|---|---|---|
| 32 | benzoyl chloride | orange |
| 33 | p-toluenesulphonyl chloride | " |

-continued

| Example | Acid Chloride | Color of Product |
|---|---|---|
| 34 | methylsulphonyl chloride | " |
| 35 | phenylacetyl chloride | " |
| 36 | chloroacetyl chloride | " |

EXAMPLE 37

A mixture of 1.4 parts of N,N'-dimethyl-p-phenylenediamine, 6.3 parts of α-acetoxyphenylacetyl chloride, 2.5 parts of sodium acetate and 50 parts of monochlorobenzene is stirred and heated under reflux for 19 hours. After cooling, the reaction mixture is filtered, the filtrate is evaporated in vacuo to small bulk and diluted with petroleum ether (b.p. 80°-100° C.) to precipitate the reaction product. The mixture is allowed to stand overnight and the precipitated intermediate product is filtered off and washed successively with water and methanol to give 1,4-di(α-acetoxy-N-methylphenylacetylamino) benzene, m.p. 185° C.

A mixture of 1.8 parts of the above intermediate product and 10 parts of polyphosphoric acid is stirred and heated at 140° C. for 8 hours. The reaction mixture is cooled, poured into water and the precipitated N,N'-dimethyl-3,7-dioxo-1,2,3,5,6,7-hexahydrobenzo[1:2-b; 4:5-b¹]dipyrrole is filtered off, washed with water and dried. This intermediate product has m.p. 180°-183° C.

A mixture of 1.4 parts of the intermediate dipyrrole product, 10 parts of ethanol, 10 parts of water, 1 part of sodium hydroxide solution (70° Tw) and 3 parts of potassium persulphate is stirred and heated under reflux for 2 hours. After cooling the mixture, the yellow-brown suspension is poured into dilute hydrochloric acid and the precipitated product is filtered off and recrystallised from ethanol by Soxhlet extraction. The N,N'-dimethyl-3,7-diphenyl-2,6-dioxo-1,2,5,6-tetrahydrobenzo[1:2-b; 4:5-b¹]dipyrrole so obtained is soluble in toluene to give an orange solution having λ max 460, and it has a molecular extinction coefficient ε max 23,200. The n.m.r. and mass spectra (m/e 366) fully support the above structure.

When dispersed in aqueous medium the dyestuff dyes aromatic polyester textile materials in yellow-brown shades having high light fastness.

In place of the N,N'-dimethyl-p-phenylenediamine used in this Example there may be used equivalent amounts of N,N'-diethyl, N,N'-di-n-butyl or N,N'-di-sec-butyl-p-phenylenediamine when analogous products are obtained which have similar properties when applied to aromatic polyester textile materials.

EXAMPLE 38

1 Part of the dyestuff of Example 29 is added portionwise to 10 parts of 100% sulphuric acid at 0° to 5° C. When the addition is completed the temp. is allowed to rise to 20° C. and the mixture is stirred at 20° C. for 1 hr. The reaction mixture is then poured into a mixture of 20% brine and ice and the precipitated product is filtered off, washed with 10% brine and dried to give a disulphonic acid derivative of the product of Example 29.

The product so obtained when applied to a polyamide textile material from an aqueous dyebath gives an orange shade.

EXAMPLE 39

A mixture of 2.94 parts of 2,5-dimethyl-3,6-dibromobenzoquinone, 4.08 parts of phenylacetic acid and 50 parts of trichlorobenzene is stirred and heated at 190°-200° C. for 3 hours in an atmosphere of nitrogen whilst allowing the water which is formed to distil off. After cooling, the reaction mixture is screened from some insoluble material and the filtrate is steam distilled to remove the solvent. The residual product is taken up in ethyl acetate, the extract is evaporated to dryness and the residue is crystallised from ethanol to give 4,8-dimethyl-3,7-diphenyl-2,6-dioxo-2,6-dihydrobenzo[1:2-b; 4:5-b¹] difuran in the form of yellow crystals, m.p. 270° C.

The dyestuff dissolves in toluene to give a bright yellow solution having λ max 428, and it has a molecular extinction coefficient of 37,000.

When dispersed in aqueous medium the dyestuff dyes aromatic polyester textile materials in bright yellow shades having excellent fastness to light.

Any unfixed dyestuff present on the surface of the textile material when the material is removed from the dyebath is readily removed by treatment of the fabric in a dilute aqueous solution of sodium hydroxide at 80° C.

EXAMPLE 40

A mixture of 2.76 parts of 2,5-dimethylhydroquinone, 7.6 parts of mandelic acid and 170 parts of 85% w/w sulphuric acid is stirred at 20° C. for 20 hours and the solution is poured into an ice/water mixture. The precipitated 4,8-dimethyl-3,7-diphenyl-2,6-dioxo-2,3,6,7-tetrahydrobenzo[1:2-b; 4:5-b¹] difuran is filtered off, washed acid-free with water and dried. The intermediate so obtained is added to a solution of 2 parts of potassium persulphate in 50 parts of water and 25 parts of 2N-sodium carbonate solution, and the mixture is heated at 60° C. for 15 minutes. The solution obtained is poured into an excess of dilute hydrochloric acid and the precipitated dyestuff is collected and recrystallised from ethanol. The product so obtained is identical with that obtained in Example 39.

We claim:
1. A dyestuff which contains a chromophoric system of the formula:

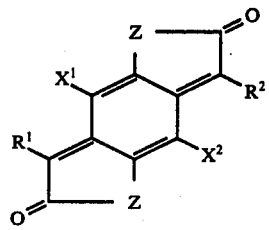

wherein each Z is —N¹Y in which Y is hydrogen or a group selected from the class consisting of lower alkyl, acetyl, n- and iso-butyryl, benzoyl, p-toluenesulphonyl, methylsulphonyl, phenylacetyl and chloroacetyl; R¹ and R² each independently represent a radical selected from the class consisting of naphthyl, unsubstituted phenyl and phenyl having at least one substituent selected from the class consisting of sulphonic acid, sulphonyl chloride, phenylaminosulphonyl, nitro, lower alkyl, lower alkoxy, halogeno, lower alkoxyphenyl, lower alkoxycarbonyl, amino, lower alkylamino and acetylamino; and X¹ and X² each independently represent a hydrogen atom or a substituent selected from the class consisting of chlorine and bromine atoms and lower alkyl groups.

2. A dyestuff according to claim 1 wherein R¹ and R² are phenyl or sulphophenyl, and X¹ and X² are hydrogen.

* * * * *